United States Patent
Friedrich et al.

(10) Patent No.: US 6,718,215 B2
(45) Date of Patent: Apr. 6, 2004

(54) SYSTEM AND AN ASSOCIATED METHOD FOR OPERATING AND MONITORING AN AUTOMATION SYSTEM BY MEANS OF VIRTUAL INSTALLATION MODELS

(75) Inventors: Wolfgang Friedrich, Bubenreuth (DE); Soeren Moritz, Wimmelbach (DE); Johann Pohany, Schwanstetten-Schwand (DE); Rene Wolf, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 09/902,575

(22) Filed: Jul. 12, 2001

(65) Prior Publication Data

US 2002/0029134 A1 Mar. 7, 2002

Related U.S. Application Data

(63) Continuation of application No. PCT/DE00/00033, filed on Jan. 4, 2000.

(30) Foreign Application Priority Data

Jan. 12, 1999 (DE) .......................... 199 00 884

(51) Int. Cl.⁷ .......................... G05B 19/18; G05B 15/00
(52) U.S. Cl. .......................... 700/65; 700/17; 700/66; 700/83; 700/98; 345/740; 345/773; 345/782; 345/965; 345/966; 345/757; 345/771
(58) Field of Search .......................... 700/17, 65, 66, 700/83, 98; 345/740, 773, 782, 965, 966, 757, 771

(56) References Cited

U.S. PATENT DOCUMENTS

| | | | |
|---|---|---|---|
| 5,647,009 A | 7/1997 | Aoki et al. | 382/100 |
| 5,956,665 A * | 9/1999 | Martinez et al. | 702/188 |
| 6,282,455 B1 * | 8/2001 | Engdahl | 700/83 |
| 6,292,712 B1 * | 9/2001 | Bullen | 700/245 |
| 6,380,949 B2 * | 4/2002 | Thomas et al. | 345/705 |

FOREIGN PATENT DOCUMENTS

| | | | |
|---|---|---|---|
| DE | 44 11 314 | 9/1995 | G06F/3/14 |
| DE | 198 14 407 | 11/1998 | G05B/13/14 |
| DE | 198 25 302 | 12/1998 | G06T/17/40 |
| EP | 0 549 504 | 6/1993 | G06F/15/16 |
| EP | 0 780 800 | 6/1997 | G06T/17/50 |
| EP | 0 782 100 | 7/1997 | G06T/7/00 |
| EP | 0 825 506 | 2/1998 | G05B/19/418 |
| WO | 00/02162 | 1/2000 | G06T/17/00 |
| WO | 00/07079 | 2/2000 | G05B/17/02 |

OTHER PUBLICATIONS

E. Natonek, et al, "Model Based Vision as Feedback for Virtual Reality Robotics Environments", 1995 IEEE (Nov. 3, 1995) pp. 110–117.

* cited by examiner

Primary Examiner—Anil Khatri
Assistant Examiner—Thomas Pham
(74) Attorney, Agent, or Firm—Sughrue Mion, PLLC

(57) ABSTRACT

A system and a method for operating and monitoring an automation system, in which, via virtual installation models (1), processes of the automation system are, by means of a display unit (2), displayed or represented as a representation of real installation components (7). The display unit 2 includes input screen sections (4a, 4b, 4c) in order to allow a user to interactively operate displayed installation components 8. The method allows the user to navigate in the virtual installation models 8, which exactly reflect the real conditions and the current conditions of the automation system. By combining 2D and 3D displays or representations, the user can choose the most appropriate form of representation for the individual case at hand. The invention thus facilitates a reality-based representation of the automation system, which makes it possible to intuitively operate and monitor even complex processes.

11 Claims, 1 Drawing Sheet

SYSTEM AND AN ASSOCIATED METHOD
FOR OPERATING AND MONITORING AN
AUTOMATION SYSTEM BY MEANS OF
VIRTUAL INSTALLATION MODELS

This is a Continuation of International Application PCT/DE00/00033, with an international filing date of Jan. 4, 2000, which was published under PCT Article 21(2) in German, and the complete disclosure of which is incorporated into this application by reference.

FIELD OF AND BACKGROUND OF THE INVENTION

The present invention relates to a system for operating and monitoring a real process of a real (i.e. actual) installation, in particular an automation system. The invention also relates to a method for operating and monitoring a real (i.e. actual) process of a real installation, in particular an automation system.

Such an operating and monitoring system is used, for example, in the field of automation technology and forms a so-called HMI (Human Machine Interface).

In the reference WO 00/07079 (which is incorporated herein by reference), a system and a method for dynamic administration of information data is described, in which the information data are information sources of a virtual device. The virtual device is the representation of a real device, such as an industrial installation. A comprehensive overview of the entire device as well as a targeted look at components of the device is achieved in that the virtual components are embedded in a networked frame structure as programs, in accordance with the technological structures of the device.

The reference WO 00/02162 (corresponding to U.S. application Ser. No. 09/750,673 and incorporated herein by reference as well) describes a method and a device for creating a virtual installation model as an representation of a real installation. Therein, digital image data, which represent a real installation, and installation components of a component library serve as a database. The generated virtual representation of the real installation serves as documentation of the actual structure of the installation. Furthermore, the virtual representation of the real installation allows for a simplified analysis of malfunctions. In addition, the use of the virtual installation model for operating and monitoring systems is described.

European Patent Application EP 0 782 100 A2 teaches a device for determining the spatial expansion of an object. The spatial expansion of the object is determined based on a plurality of images taken from various spatial directions and based on of information obtained from the position of the camera being used. The thus obtained 3D model can be two-dimensionally displayed on a monitor.

European Patent Application EP 0 285 506 A2 teaches a system for controlling processes, wherein the system includes a server computer and a client computer, which are coupled via a network, such as the Internet or an Intranet. In addition, the server is linked to a real process via interface components. The client is designed in such a way that a process is operated and monitored by communications via the network and via the server. The disclosure of both of the above European Patent Applications are incorporated herein by reference.

OBJECTS OF THE INVENTION

It is an object of the present invention to provide a system and a method for operating and monitoring real processes, wherein the system and the method allow for a display and an assessment of process conditions in a manner that is as realistic as possible. A further, related object is to ensure an error-free operation of the real processes.

SUMMARY OF THE INVENTION

According to one formulation of the present invention, these and other objects are achieved by a system for operating and monitoring real processes of a real installation that has real installation components. Therein, the system includes a storage device for storing virtual installation models, which represent the real installation components. Furthermore, the system includes a display unit for displaying the virtual installation models and interactive interfaces that are included in at least one of the virtual installation models and the display unit. A coupler includes a first connection for coupling the interactive interfaces with process data of the real installation components. Therein, the first connection includes a process coupling forward channel as an output of the display unit. The coupler also includes a second connection for coupling the virtual installation models with the process data of the real installation components. Therein, the second connection comprises a process coupling backward channel as an input of the display unit.

The invention is based, among other things, on the recognition that an operation of an automation system in a manner that is as realistic as possible and, therefore, an error-free operation of the automation system can be ensured in that the HMI (Human Machine Interface) includes virtual installation models that represent the real installation components.

These virtual installation models are displayed to a user by means of a display unit, for example, wherein, depending on the requirements of the individual installation model, the virtual installation models can be represented as a 2D and/or a 3D representation. It is one distinguishing feature of the method and the system in accordance with the present invention that the real installation components, i.e., the real processes including their current process data, are integrated into the display of the virtual installation models. This is achieved by a coupling, which couples the virtual installation models to the process data of the real installation components. In addition, the display unit includes, for example, certain screen sections for interactive purposes, via which the real process can be operated. The overall result is a system for displaying processes by means of virtual reality models (VR models). Through this system, the conditions of the real process are continually displayed according to pre-specified criteria. Therein, the conditions are mapped on an animated, representative virtual installation model.

By interacting with the virtual installation model, a user is able to change process values. German Laid-Open Publication DE 198 32 974.1, also hereby incorporated herein by reference, teaches one example for creating virtual installation models.

To ensure user navigation that is as realistic as possible, the system includes a control device for updating the display of the virtual installation models, wherein the respective displays depend on the current position of a virtual camera.

To further improve the overview of even complex installations and processes, the control device controls the process display in such a way that, depending on the distance of the observer, more or less information about the virtual installation model is displayed.

The interior of the installation components can be viewed by designing the virtual installation models in such a manner that they are transparent and that they allow for viewing component parts that are covered in the real installation components. Therein, the envelope of the transparent installation model is still displayed so that the spatial context can still be recognized.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
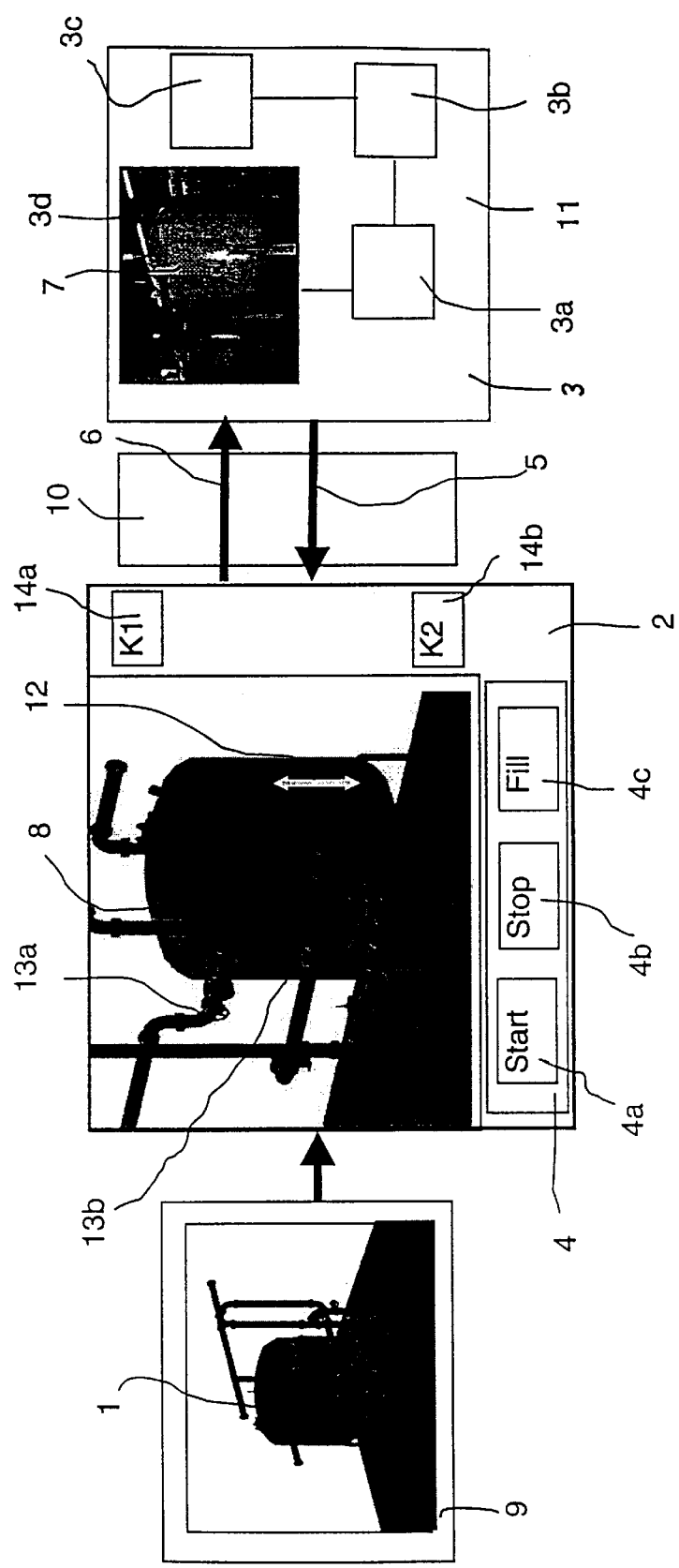
FIG. 1 shows a block diagram of a preferred embodiment of an operating and monitoring system that is capable of displaying a process.

FIG. 1 shows a block diagram of a preferred embodiment of an operating and monitoring system that is capable of displaying a process. The operating and monitoring system includes primarily a data processing device. The data processing device includes, among other things, a storage device 9 for storing virtual installation models 1 and a display unit 2 for displaying the virtual installation models 1. Furthermore, the display unit 2 includes interaction interfaces 4, 14 provided next to the displayed virtual installation models 1. The interaction interfaces 4 include individual screen sections 4a, 4b, 4c, to which certain functions with regard to a displayed installation component are assigned. By means of interaction fields 14a, 14b, a virtual camera position can be varied so that the installation parts displayed in the middle area of the screen of the display unit 2 can be changed. Furthermore, further interaction fields 13a, 13b are provided in the area of the virtual installation model 8 itself. By clicking on these interaction fields 13a, 13b, for example by means of a "mouse", corresponding valves of virtual pipes, which are arranged at the virtual tank 8, can be opened or closed. The signal processing parts of the display unit 2 are linked to a real process 3 of an actual automation system 11 via a coupling device 10, wherein the real process 3 includes partial processes 3a . . . 3d. Therein, a first connection 6 (=process-coupling forward channel) serves as an output channel from the display unit 2, while a second connection 5 (=process-coupling backward channel) is designed as an input channel to the display unit 2.

It is one distinguishing characteristic of the system shown in FIG. 1 that the virtual installation models 8 are enriched with actual process signals by means of the coupling device 10 and the connections 5, 6. This enrichment of the virtual installation models 8 with process data and process signals makes it possible to dynamically reflect the current condition of a real process 3 in a virtual installation model by means the display unit 2 and in the form of the associated display of the process. Furthermore, process values can be interactively changed via the virtual installation model 8. This can be achieved with the aid of the interaction interfaces 4a, 4b, 4c, for example. For instance, a real process 3 can be started by the interaction interface 4a or stopped by the interaction interface 4b. By means of the third interaction interface 4c, the virtual tank 8 and a real tank 7 can be filled, for example. Preferably, the respective resulting current fluid level in the tank 8 is indicated by an arrow 12 in the area of the virtual tank model, for example. In addition or alternatively, the condition of the processes or of a virtual model can be shown in a wide variety of forms, for example through color changes, position changes, etc.

The system shown in FIG. 1 thus enables a user to navigate in virtual reality models, which are enriched by or supplemented with signals from, and which reflect the current status of, a real process 3 to be monitored. The current display of a virtual installation model 8 is dependent on the current position of a virtual camera, for example. Therein, the user sees only the current camera section in the process display. The camera position can be controlled, for example, by the interaction interfaces 14a, 14b. In this context, navigation is understood to be a dynamic and interactive change of the camera position by the user. The user can choose a process view that is currently relevant to him or her. For example, the user can navigate from a general overview to a malfunctioning part of the installation, without losing his or her spatial orientation (=camera movement). This utility can be improved by using virtual reality techniques such as "level of details", transparency, and various abstract representations for an installation component. Depending on the distance of the observer from the installation, the "level of detail" technique allows for displaying more or less information about a component in the virtual installation model 8. The "transparency" technique allows for looking into the interior of an installation component, for example, or for looking at covered or obstructed installation components, without the user losing his or her spatial orientation. For example, the coverings or outlines of the virtual components can remain slightly visible to aid in the spatial orientation.

In the preferred embodiment shown in FIG. 1, the virtual installation models are shown in perspective, i.e., in such a way that they can be easily interpreted by a human being because they look natural. In this way, even installations with large dimensions can be displayed on the screen in a compact manner, without danger of the user losing the overview over the installation. A combination of 2D and 3D images is especially well suited for displaying the virtual installation models 1, 8. Preferably, the 3D image allows for an overview of the installation, while, in contrast thereto, the 2D image displays process values and operating elements very compactly. This is independent of the current view at the installation components. Both of these features are combined by means of the process display unit 2, wherein 2D elements can be combined with VR views (virtual reality) into an installation display image so as to form a virtual reality model. The component to be viewed or to be operated is selected, for example, in the virtual reality model by displaying or changing the respective process values, for example with the help of the 2D elements.

Through a realistic display of the process status based on the virtual installation model 8, the knowledge of the user, such as the knowledge about critical conditions, can be incorporated into operating and monitoring the real installation. As a result, for example, malfunctions can be intuitively recognized in time. For instance, a non-uniform distribution of containers in a block warehouse or a high rack warehouse can be recognized and conclusions with respect to irregular distributions can be drawn. Because of the realistic display of the real installation, the user can react "on the spot", as he or she is normally used to. This results in a more intuitive and therefore more reliable operation of the real installation 11. The step of switching from the real representation to an abstract representation is eliminated. The spatial arrangement of the display unit 2, i.e., of the operating and monitoring system, can be completely remote and independent of the real installation 11. The coupling between the display unit 2 and the real installation 11, i.e., the forward channel 6 and backward channel 5, is realized, for example, as an Ethernet, Intranet or Internet connection. Thus, the real installation 7, 11 can be realistically operated independent of the actual location of the real installation 7, 11.

In the following, the essential responsibilities of the display unit 2 are described and explained. The display unit 2 is responsible for reading in a virtual installation model 1, 8; for assigning current process values to input and output signals of the virtual installation model 8 and the interaction interfaces 4, 14; for providing the input signals of the virtual installation model 8 with the real process values; for providing the interaction means 4, 14 with the real process 3; for transmitting the output signals 6 from the virtual installation model 8 to the real process 3; for displaying, e.g., superimposing, the current process condition onto the basic version of the virtual installation model 8; for displaying additional 2D elements 4, 14, for example in the form of text and/or graphics; and for setting up images for the process display 2, which include 2D elements and 3D views, i.e., representative views.

The process display unit 2 thus forms a system that includes hardware and software components. The hardware components include the usual components found in a computer system, in particular a so-called CPU (Central Processor Unit); a primary storage; a secondary storage, such as hard disk; input devices, such as a keyboard; pointing devices (e.g., mouse, 3D mouse); output devices, such as a graphic card, a screen, a video projector, 3D projectors, etc.; and communication devices, such as an Ethernet network card. Therein, the use of the hardware and the coordination of the software modules is supported by an operating system.

The process display unit 2 includes a so-called virtual reality import, which reads in a virtual reality model, for example in VRML format. The virtual reality import also provides for conversion into the internal representation of the component displays. The component display, which includes 2D elements and 3D views, is capable of displaying images on a projection system, for example a computer screen, and is capable of updating the images based on events and changes of the process values of the real process. Furthermore, the component display is capable of evaluating information inputs via the interaction interfaces 4, 13, 14, and of sending the information inputs to the 2D elements or the 3D views. Therein, an event is understood to be a value, which can be sent to components that have an event interface. The value is sent to these components via the operating system, for example via a mouse click or via the process coupling.

The 2D elements are typical elements of a computer graphic, such as lines, curves, rectangles, text, etc. Therein, the 2D elements can also include a grouping of other 2D elements. The 2D elements and the 3D views of the operating and monitoring system shown in FIG. 1 have an interface, via which the events can be sent or received. Therein, incoming events can lead to a change in the internal condition or state of a 2D element or a 3D view, i.e., for example to a change in the display or representation, such as a change of color, position, or size. By means of the 3D views, a display or representation of the virtual installation models 1, 8 is achieved. All image information, the construction of the images, the interconnection of the 2D elements and the 3D views with the process values or the interconnection between the 2D elements and the 3D views, the list of the available process values, and the communication information required for exchanging the process values with the real process are held by means of a data storage or data buffering.

In summary, the present invention relates to a system and a method for operating and monitoring an automation system, in which, via the virtual installation models 1, the processes of the automation system are, by means of the display unit 2, displayed or represented as a representation of the real installation components 7. The display unit 2 includes the input screen sections 4a, 4b, 4c, 13a, 13b, 14a, and 14b in order to allow a user to interactively operate and monitor the displayed installation components 8. The inventive method allows the user to navigate in the virtual installation models 8, which reflect essentially exactly the real conditions and the current conditions of the automation system. By combining 2D and 3D displays or representations, the user can choose the most appropriate form of representation for the individual case at hand. The invention thus facilitates a reality-based representation of the automation system, which makes it possible to intuitively operate and monitor even complex processes.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system for operating and monitoring real processes of a real installation having real installation components, comprising:
    a storage device for storing virtual installation models, which represent the real installation components;
    a display unit for displaying the virtual installation models;
    interactive interfaces that are included in at least one of i) the virtual installation models and ii) the display unit; a virtual camera; a control device to control updated displays of the virtual installation models in accordance with a respective current position of the virtual camera, wherein the control device comprises a controller for controlling displays of the real processes such that an amount of information displayed in the virtual installation models is a function of a viewing distance from the real installation; and
    a coupler, comprising:
        a first connection for coupling the interactive interfaces with process data of the real installation components, wherein the first connection comprises a process coupling forward channel as an output of the display unit; and
        a second connection for coupling the virtual installation models with the process data of the real installation components, wherein the second connection comprises a process coupling backward channel as an input of the display unit.

2. The system as claimed in claim 1, wherein the real installation comprises an automation system.

3. The system as claimed in claim 1, wherein the display unit displays the virtual installation models as at least one of i) two-dimensional objects and ii) three-dimensional objects.

4. The system as claimed in claim 1,
    wherein the virtual installation models include transparent portions allowing a view at component parts that are covered in the real installation components; and
    wherein respective outlines of the transparent portions are displayed to ensure spatial orientation within the virtual installation models.

5. The system as claimed in claim 1, wherein the interactive interface is provided in the area of the virtual installation model itself.

6. The system as claimed in claim 1, further comprising a controller that updates the display unit based on information from the real installation, as the information is received via the second connection.

7. A method for operating and monitoring a real process of a real installation having real installation components, comprising:

storing virtual installation models in a storage device, wherein the virtual installation models represent the real installation components;

displaying the virtual installation models by means of a display unit; wherein the virtual installation models are displayed in accordance with a current position of at least one virtual camera, and wherein an amount of information displayed in the virtual installation models is a function of a viewing distance from the real installation;

operating the real installation via interactive interfaces and via a first connection that is designed as a process coupling forward channel as an output of the display unit, wherein the interactive interfaces are included in at least one of i) the virtual installation models and ii) the display unit; and feeding the virtual installation models with process data from the real installation components via a second connection that is designed as a process coupling backward channel as an input of the display unit.

8. The method as claimed in claim 7, wherein the virtual installation models are displayed as at least one of i) two-dimensional objects and ii) three-dimensional objects.

9. The method as claimed in claim 7, wherein the virtual installation models include transparent portions allowing a view at component parts that are covered in the real installation components; and wherein respective outlines of the transparent portions are displayed to ensure spatial orientation within the virtual installation models.

10. The method as claimed in claim 7, wherein operating the real installation via interactive interfaces comprises operating an interactive interface provided in the area of the virtual installation model itself.

11. The method as claimed in claim 7, further comprising updating the display unit based on the process data from the real installation, as the process data is fed via the second connection.

* * * * *